United States Patent [19]

Eaton

[11] Patent Number: 4,493,313
[45] Date of Patent: Jan. 15, 1985

[54] PARABOLIC TROUGH SOLAR COLLECTOR

[76] Inventor: James H. Eaton, 29 Sunrise Dr., Armonk, N.Y. 10504

[21] Appl. No.: 372,882

[22] Filed: Apr. 29, 1982

[51] Int. Cl.³ .................................................. F24J 3/02
[52] U.S. Cl. .................................... 126/438; 350/628; 350/631
[58] Field of Search ................ 126/438, 439; 350/288, 350/289, 293, 309, 370, 296

[56] References Cited

U.S. PATENT DOCUMENTS

| | | | |
|---|---|---|---|
| 3,883,820 | 5/1975 | Burns et al. | 350/288 X |
| 4,103,672 | 8/1978 | Meyer | 350/293 |
| 4,116,221 | 9/1978 | Zaugg et al. | 350/288 X |
| 4,127,926 | 12/1978 | White | 350/293 X |
| 4,205,659 | 6/1980 | Beam | 126/438 |
| 4,243,019 | 1/1981 | Severson | 126/438 |
| 4,268,332 | 5/1981 | Winders | 126/438 X |
| 4,293,192 | 10/1981 | Bronstein | 350/310 X |
| 4,390,241 | 6/1983 | Trihey | 126/438 X |

Primary Examiner—Larry Jones

[57] ABSTRACT

A parabolic trough solar collector using reflective flexible materials is disclosed. A parabolic cylinder mirror is formed by stretching a flexible reflecting material between two parabolic end formers. The formers are held in place by a spreader bar. The resulting mirror is made to track the sun, focusing the sun's rays on a receiver tube. The ends of the reflective material are attached by glue or other suitable means to attachment straps. The flexible mirror is then attached to the formers. The attachment straps are mounted in brackets and tensioned by tightening associated nuts on the ends of the attachment straps. This serves both to stretch the flexible material orthogonal to the receiver tube and to hold the flexible material on the formers. The flexible mirror is stretched in the direction of the receiver tube by adjusting tensioning nuts. If materials with matching coefficients of expansion for temperature and humidity have been chosen, for example, aluminum foil for the flexible mirror and aluminum for the spreader bar, the mirror will stay in adjustment through temperature and humidity excursions. With dissimilar materials, e.g., aluminized mylar or other polymeric material and steel, spacers can be replaced with springs to maintain proper adjustment. The spreader bar cross section is chosen to be in the optic shadow of the receiver tube when tracking and not to intercept rays of the sun that would otherwise reach the receiver tube. This invention can also be used to make non-parabolic mirrors for other apparatus and applications.

13 Claims, 7 Drawing Figures

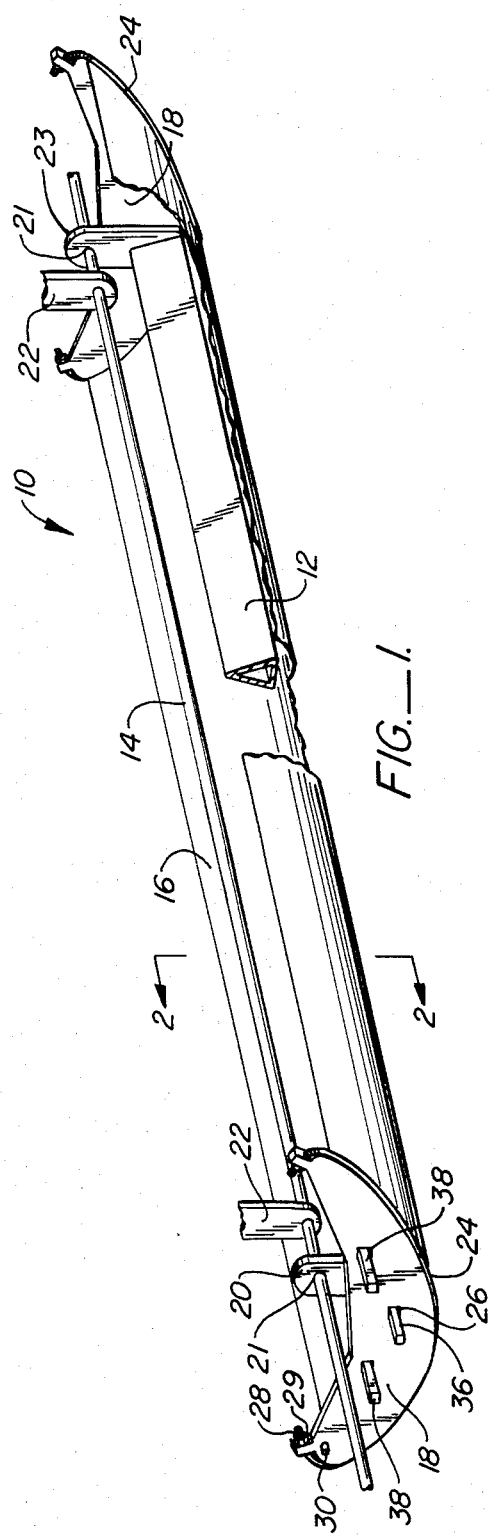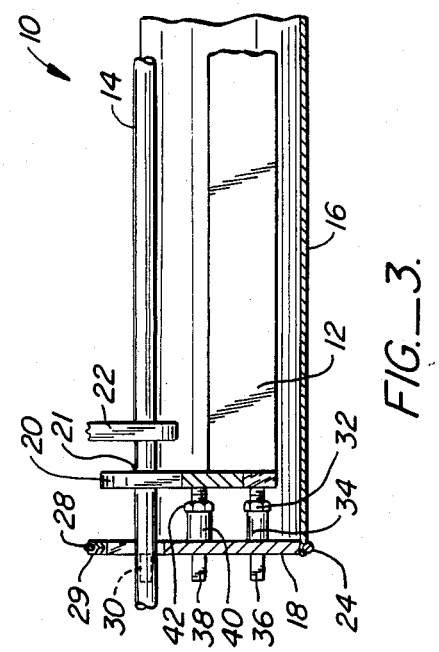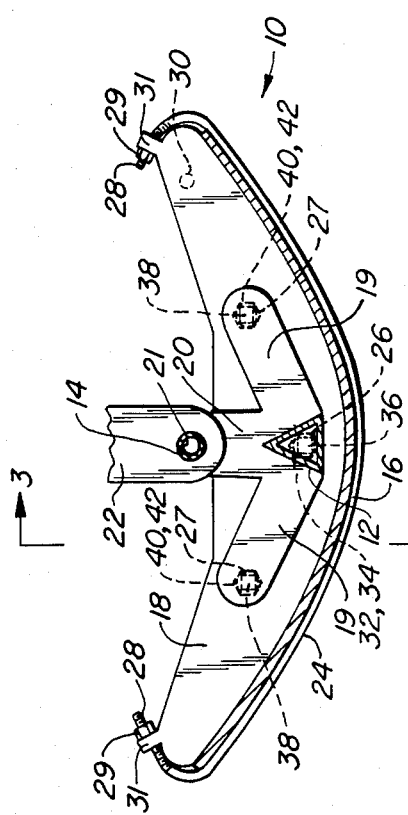

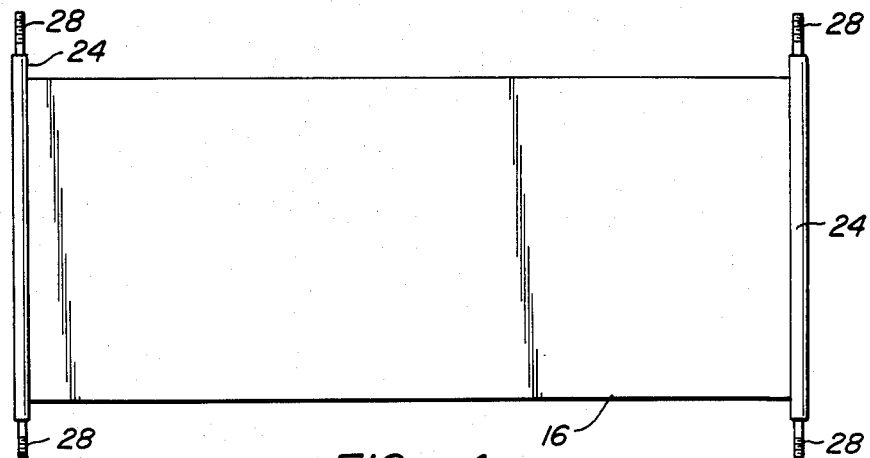
FIG._4.
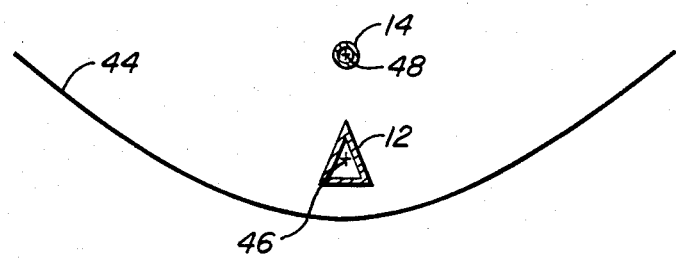
FIG._5.
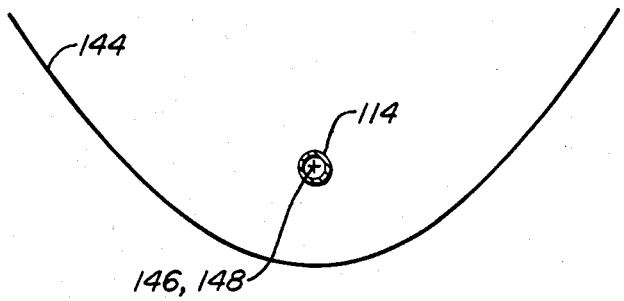
FIG._6.

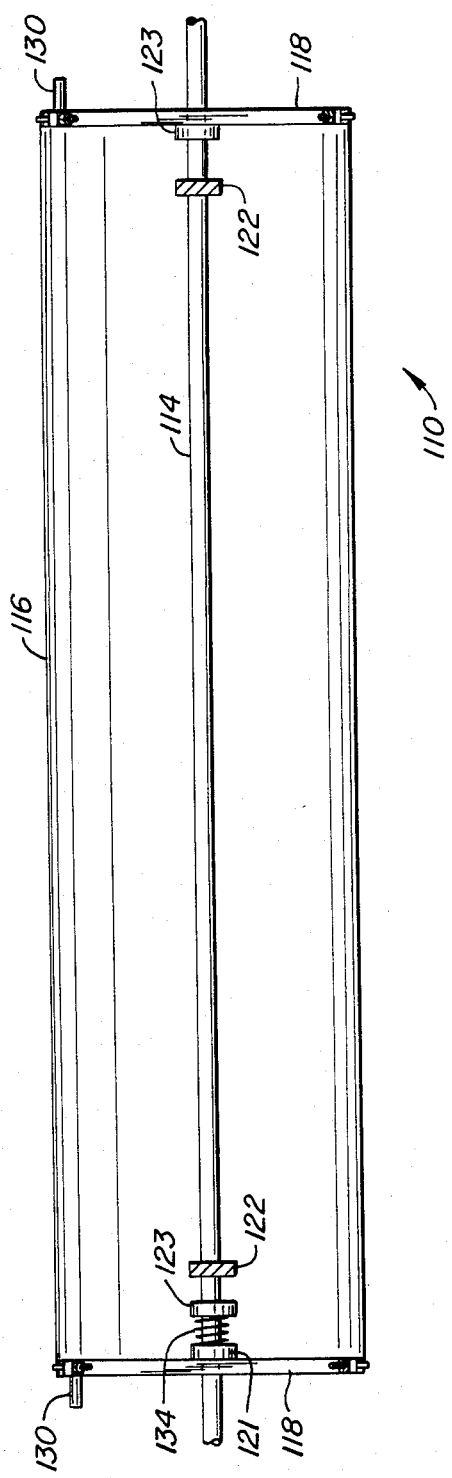

PARABOLIC TROUGH SOLAR COLLECTOR

FIELD OF THE INVENTION

This invention relates to solar energy collecting apparatus, more particularly to a parabolic trough solar collector which uses flexible reflective foil material.

BACKGROUND OF THE INVENTION

Ability of solar collector apparatus to work at higher temperatures is advantageous for home spacing heating and other applications. The cost of flat plate solar collectors and their inability to efficiently deliver water at high temperatures in the range of 140° F. to 200° F. usually make them unsuitable for home space heating. Conventional parabolic tracking reflectors can deliver water at high temperatures but are costly.

It is known to use aluminum foil or aluminized mylar foil in parabolic reflectors, but heretofore difficulty in accurately maintaining the parabolic shape of such thin films has reduced their efficiency or rendered their use impractical.

The basic objective is to form the foil into a parabolic cylinder mirror whose line of focus is on a receiver tube. To achieve low cost it is important that the length of the parabolic cylinder that can be accurately formed and maintained be maximized. One difficulty with the prior art parabolic foil collectors stems from the fact that the thin foil itself is unable to support bending moments. The structural beam formed by the parabolic foil cylinder is also unable to support torque along its axis. Bending moments or torque cause the structural beam to deform, displacing the line of focus and degrading the quality of the focus. Hence, it has been impractical to form parabolic flexible foil collectors of sufficient length and durability to achieve the cost effectiveness which is desired from the use of thin foil.

A patent to Cohen, U.S. Pat. No. 4,184,482, describes one proposal for the utilization of a thin sheet for the solar energy reflecting surface. An attempt is made in Cohen to utilize the receiver tube to support the foil collector. However, as in other attempts in the art, little or no provision was made for the prevention of distortion from torque or bending moments. Because of the likelihood of such forces, either the receiver tube or the parabolic cylinder of the Cohen device would soon deform and, hence, that solution is deemed unsatisfactory.

Various other examples of parabolic reflector apparatus and methods of making the same can be found in prior patents as follows:

U.S. Pat. No. 3,635,547—Jan. 18, 1972
U.S. Pat. No. 3,781,095—Dec. 25, 1973
U.S. Pat. No. 3,843,238—Oct. 22, 1974
U.S. Pat. No. 3,973,834—Aug. 10, 1976
U.S. Pat. No. 4,103,672—Aug. 1, 1978
U.S. Pat. No. 4,127,926—Dec. 5, 1978
U.S. Pat. No. 4,173,397—Nov. 6, 1979
U.S. Pat. No. 4,276,893—Apr. 28, 1981
U.S. Pat. No. 4,268,332—May 19, 1981

SUMMARY OF THE INVENTION

The present invention provides a parabolic trough solar collector which includes a parabolic foil reflector supported in cooperating relationship with a receiver tube so as to focus the parallel rays of the sun onto the line of the receiver tube. Formers compose the flexible foil into a parabola. A spreader bar attached to the formers maintains the parabolic shape of the reflector against bending moments and torque.

A means for forming a parabolic trough solar collector aimed at minimizing materials and assembly cost is disclosed. Some of the advantages of the apparatus of the present invention are: low materials cost, easy low-cost replacement of reflective surfaces, light weight and ease of construction. Field assembly under cramped and adverse conditions is possible.

As noted above, to achieve low cost it is important that the length of the parabolic cylinder that can be accurately formed between the end formers be mazimized. The key requirements that must be satisfied to achieve an accurate parabolic cylinder mirror of substantial length between formers are:

(1) The structural beam formed by the parabolic cylinder must not be required to support bending moments. Supporting bending moments causes the structural beam to deform which displaces the line of focus and degrades the quality of the focus. The unique spreader bar of the present invention satisfies this requirement. The spreader bar is so located as to minimize and itself absorb bending moments or to prevent them entirely.

(2) The structural beam formed by the parabolic cylinder must not be required to support torque along its axis. The structural beam is weak with respect to torsion and small torques degrade its parabolic shape. Since the spreader bar serves as a torque tube to hold the end formers in alignment, the parabolic cylinder mirror is not required to support torque, satisfying this requirement.

(3) The foil must be accurately mounted on the end formers so that forces applied to tension the foil to produce the parabolic cylinder will uniformly strain the foil and not produce the wrinkles and ridges associated with non-uniform strain. To this end, there are disclosed attachment straps which are glued to the foil, placed with the foil on the formers, and then tightened by a thread and nut arrangement.

(4) The parabolic cylinder mirror must accurately maintain its shape over the desired range of working temperature and humidity. To satisfy the requirement, in one embodiment of the present invention, the foil and spreader bar are made from materials with the same coefficient of expansion with temperature and humidity. For example, both may be made of aluminum. In embodiments, where different coefficients of expansion are involved, e.g., aluminized mylar foil and an aluminium spreader bar, spring spacers are disclosed between the formers and the spreader bar to accommodate the relative change in length.

(5) In supporting the parabolic cylinder mirror, the receiver tube must also not be required to support bending moments associated with tensioning the foil that would displace the receiver tube out of the line of focus of the parabolic cylinder mirror. It is desireable to have the receiver tube as slender as possible to minimize heat loss which increases with the diameter of the receiver tube. If, in addition to its own weight, the receiver tube is required to support bending moments associated with tensioning the foil, either its diameter would have to be increased or it would have to be supported at intermediate points between the end formers. Again, unlike prior art devices, the present invention does not require the receiver tube to support bending moments.

Other novel features which are characteristics of the invention, as to organization and method of operation, together with further objects and advantages thereof will be better understood from the following description considered in connection with the accompanying drawing in which preferred embodiments of the invention are illustrated by way of example. It is to be expressly understood, however, that the drawing is for the purpose of illustration and description only and is not intended as a definition of the limits of the invention.

BRIEF DESCRIPTION OF THE DRAWING

FIG. 1 is a perspective view of an embodiment of the present invention;

FIG. 2 is a sectional view through line 2—2 of FIG. 1;

FIG. 3 is a sectional elevation of the embodiment of FIG. 1 showing the mechanism for connecting the spreader bar to the end former;

FIG. 4 is a plan view showing connection of the attachment straps to the foil prior to assembly of the solar collector of the present invention;

FIG. 5 is a schematic representation of an embodiment of the present invention;

FIG. 6 is a schematic representation of another embodiment of the present invention; and FIG. 7 is a plan view of the embodiment of FIG. 6.

DESCRIPTION OF THE PREFERRED EMBODIMENTS

FIGS. 1 and 2 illustrate an embodiment 10 of the solar collector of the present invention. A suitable flexible reflecting foil 16 is attached to parabolic end formers 18 using attachment straps 24. A spreader bar 12, substantially hidden in the optic shadow of a receiver tube 14 so as not to intercept rays of the sun that would otherwise be reflected onto the receiver tube 14, is mounted on the receiver tube 14 using the journal bearings 21 of brackets 20, 23. The spreader bar 12 is used to force the end formers 18 apart, thus tensioning the foil 16 and forming it into a parabolic cylinder mirror whose line of focus is on the receiver tube 14. The force of the spreader bar 12 is applied to the end formers 18 at the center of force produced by tension in the foil when the end formers 18 are forced apart in such a manner that they remain parallel to each other. For foils of uniform thickness and uniform modulus of elasticity along a cut that is perpendicular to the axis of the foil 16, this point is the centroid of the parabolic arc formed by the foil 16 when it is wrapped onto the parabolic end formers 18. Plastic films such as mylar (PET) tend to be anisotropic and non-uniform in their modulus of elasticity and for such films the center of force must be determined for each material. With the force of the spreader bar 12 applied at the center of force due to tension in the foil 16, no couple is produced that must be constructed by a bending moment in the structural beam formed by the parabolic cylinder mirror. This embodiment is illustrated by the spreader bar 12 and bracket 23 combination shown at right in FIG. 1.

It is clear that the force of the spreader bar 12 can be applied at multiple points surrounding the centroid and the force at each point adjusted so that the resultant force is in line with the center of force produced by tensioning the foil 16. This is an alternative embodiment, illustrated by the spreader bar 12 and bracket 20 combination shown at left in FIG. 1 and in detail in FIG. 2. Either of the above embodiments satisfy requirement (1) supra. The collector 10 is mounted by supports 22.

FIG. 2 is a sectional view of the embodiment of FIG. 1, taken along lines 2—2. The thicknesses of the foil 16 and attachment strap 24 have been greatly exaggerated for clarity. Note that the locating hole 26 in the end former 18 in FIG. 2 is rectangular, as is the locating pin 36. When assembled, these mate together and prevent the end former 18 from turning with respect to the spreader bar 12. Thus, the spreader bar 12 also serves as a torque tube to hold the end formers in alignment. Spreader bar 12 is of hollow triangular cross-section, which maximizes its resistance to bending and torque while minimizing its optic profile and weight. Therefore, neither the receiver tube 14 nor the parabolic cylinder mirror are required to support torque to hold the end formers 18 in alignment.

If the receiver tube 14 is of diameter d, then the base of the triangular spreader bar 12 should also be of width d. If the distance from the center of the receiver tube 14 to the foil 16 beneath it is h, then the height of the triangular bar 12 should be h/2 (not illustrated). This will insure that none of the sun's rays are intercepted by the spreader bar 12 either directly or after reflection from the foil 16.

The force of the spreader bar 12 is applied at multiple points on the former 18 through the use of arms 19 of bracket 20. Locating pins 38 again mate with correspondingly situated locating holes 27 on former 18, and serve to distribute the resultant force in line with the center of force produced by tensioning the foil 16. Both bracket designs, 20, 23 satisfy requirement (2) supra.

Another key element of the disclosed invention is illustrated in FIG. 4. The foil 16 is laid on a flat surface and attachment straps 24 are affixed with adhesive or otherwise attached to the side of the foil 16 that will eventually be opposite the sun when the system is in operation. The straps are attached perpendicular to the major axis of the foil 16 and parallel to each other. These straps are then referenced to the edge of the end formers 18 and attached by tightening the attachment nuts 29 on the threaded ends 28 of straps 24 and against brackets 31 of formers 18, as shown in FIG. 2. The foil 16 is held in position on the end formers 18 by the pressure of the attachment straps 24 normal to the edge of the end formers 18. Thus, the adhesive is not required to have sufficient long-term strength to resist the tensioning force created by the next step, namely tightening the tensioning nuts 32, 42 shown in FIG. 3 to tension the foil 16 axially and bring it into the required parabolic cylinder shape. Hollow spacers 34, 40 have their length preselected to conform to the length of foil 16. The attachment straps 24 are first fixed to the end formers 18 with the tensioning nuts 32, 42 backed off sufficiently so that the foil 16 does not have to stretch to allow the attachment straps 24 to be referenced to the end formers 18. Tabs (not illustrated) on the edge of the attachment straps 24 could be used to further simplify referencing the straps to the end formers. The above method provides an easy means of satisfying requirement (3). In addition, it provides for an easy and low cost way to replace the relective foil 16 in the field if it becomes tarnished or otherwise damaged.

The solar collector 10 is driven to track the sun via drive pin 30 through a solar tracking system which is conventional in the art and is not illustrated. Also not illustrated are any number of conventional heat distribution systems which may be connected to receiver tube 14, and the enclosure which protects the solar collector 10 from wind loading and weather.

The fourth requirement, namely, to maintain the accuracy of the shape of the parabolic cylinder mirror over the desired working temperature and humidity of the system is easily accomplished in the preferred embodiment in which the foil 16 and the spreader bar 12 are made from materials with the same coefficient of expansion with temperature and humidity, for example where both are made of aluminum. If made from materials with different coefficients of expansion with respect to temperature and humidity, for example, aluminized mylar (PET) foil and aluminum spreader bar, the spacers 34, 40 shown in FIG. 3 can be replaced with springs. The springs can accommodate the relative change in length between the foil 16 and spreader bar 12 and maintain approximately uniform tension in the foil 16. It should be noted that in this case only one of the journal bearings 21 should have thrust capability so that the other can accommodate the changes in length due to differences in coefficients of thermal expansion and differences in temperature between the receiver tube 14 and the spreader bar 12.

FIG. 5 is a schematic representation which shows the preferred parabolic arc 44 with centroid 46 used when a spreader bar 12 is employed. Receiver tube 14 is placed on the line of focus 48, well above centroid 46. This shape has sufficient bending strength so that the sag due to its own weight is very small, also the height of the enclosure used to protect the parabolic cylinder mirror from wind loading and weather for a mirror of given width is minimized.

FIG. 7 is a representation of another embodiment 110 of the present invention that utilizes the fact that the centroid 146 of the parabolic arc 144 and the line of focus 148 of the parabolic cylinder mirror can be made to coincide, as shown schematically in FIG. 6. In this case, the receiver tube 114 can be used in lieu of a spreader bar to force the end formers 118 apart. It is necessary to add thrust bearings 123 mounted on the receiver tube 114 and spring 134 to keep the foil 116 properly tensioned over the working temperatures of the receiver tube 114. In addition, both the end formers 118 must be driven via a pair of drive pins 130 to track the sun since the parabolic cylinder mirror has little capability to transmit torque and keep the end formers 118 aligned. Supports 122 are used to mount the apparatus.

In summary, it can be seen that the parabolic trough solar collector of the present invention is surprisingly sturdy yet simple and inexpensive to construct. While the above provides a full and complete disclosure of the preferred embodiments of the invention, various modifications, alternate constructions, and equivalents may be employed without departing from the true spirit and scope of the invention. For example, other materials are available for both the foil 16 and the spreader bar 12. Cross-sectional shapers other than triangular can be envisioned for the spreader bar 12 and multiple spreader bars 12 might be useful in some applications. Therefore, the above description and illustrations should not be construed as limiting the scope of the invention which is defined by the appended claims.

I claim:

1. A solar collector, including:
  (a) a receiver tube;
  (b) a foil reflector;
  (c) at least two means for forming the foil reflector into a semi-cylindrical parabolic arc having a centroid for focusing solar radiation onto the receiver tube, the forming means at spaced apart intervals along the solar collector;
  (d) spreader means attached to at least two of the forming means in the optic shadow of the receiver tube for holding the forming means in spaced apart relation along the solar collector to maintain the parabolic shape of the foil reflector against bending moments and torque;
  (e) means for applying the force of the spreader means against the forming means at the centroid of the parabolic arc; and
  (f) means for supporting the receiver tube, foil reflector, forming means, and spreader means in cooperating relationship.

2. A solar collector, including:
  (a) a hollow receiver tube for circulating fluid;
  (b) a flexible foil reflector;
  (c) a pair of rigid formers each attached to an end of the reflector, the formers shaping the reflector into a parabola for focusing solar radiation onto the receiver tube, each former having at least one locating hole;
  (d) a hollow spreader bar of triangular cross section;
  (e) a pair of brackets each attached to an end of the spreader bar, each bracket having a journal bearing through which slidably passes the receiver tube, the apex of the triangular spreader bar mounted on the brackets facing the receiver tube so that the spreader bar is generally in the optic shadow of the receiver tube;
  (f) at least two locating pins, at least one locating pins extending from each end of the spreader bar, the locating pins extending through the locating holes of the formers; and
  (g) spacers means on the locating pins for tensioning the foil reflector.

3. The solar collector of claim 1, wherein the spreader means is a hollow bar of triangular cross-section.

4. The solar reflector of claim 1 or 2, further including a pair of attachment straps glued to the foil reflector, the straps having adjustable attachment means for mounting and tensioning the foil reflector on the formers.

5. The solar collector of claim 1 or 2, further including drive means on at least one former for tracking the solar collector against changes in position of the sun.

6. The solar collector of claim 1 or 2, wherein the foil is isotropic.

7. The solar collector of claim 2 wherein the foil reflector and the spreader bar are made of materials which have different coefficients of expansion with temperature and humidity and the spacer means are springs for accommodating relative changes in length of the reflector and the spreader bar.

8. The solar collector of claim 2 wherein the locating holes and the locating pins all are of matching rectangular cross-section for maintaining the parabolic shape of the foil reflector against torque.

9. In a solar collector having
  (a) a receiver tube,
  (b) a foil reflector, and
  (c) means for forming the foil reflector into a parabolic shape having a center of force for focusing solar radiation onto the receiver tube,
  (d) the improvement including:
    (d-1) a spreader bar;

(d-2) bracket means for mounting the spreader bar in the optic shadow of the receiver tube; and (d-3) means for attaching the spreader bar to the forming means with the force of the spreader bar applied to the forming means at the center of force of the foil reflector whereby the parabolic shape of the foil reflector is maintained against bending moments and torque.

10. The solar collector of claim 9, wherein the spreader bar is rigid and hollow.

11. The solar collector of claim 9, wherein the spreader bar has a cross-sectional that is other than round.

12. The solar collector of claim 9, wherein the spreader bar is triangular.

13. A solar collector, including:
(a) a parabolic foil reflector having a parabolic centroid coincident with a line of focus;
(b) a receiver tube having an axis coincident with the centroid and line of focus;
(c) at least two thrust bearings mounted on the receiver tube;
(d) at least two end formers mounted on the receiver tube by the thrust bearings; and
(e) the foil reflector attached to the end formers with the thrust of the thrust bearings applied to the formers at the centroid and line of focus of the reflector.

* * * * *